Feb. 27, 1940. P. F. THAU 2,191,688
SWIVEL COUPLING
Filed Dec. 22, 1937
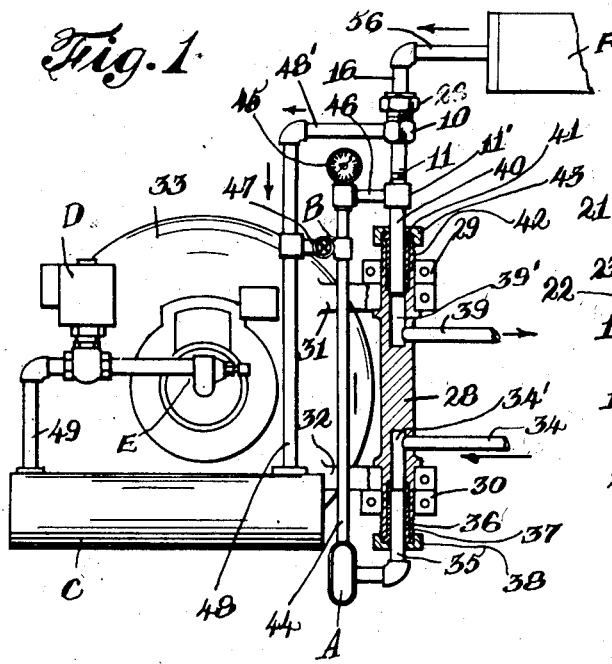
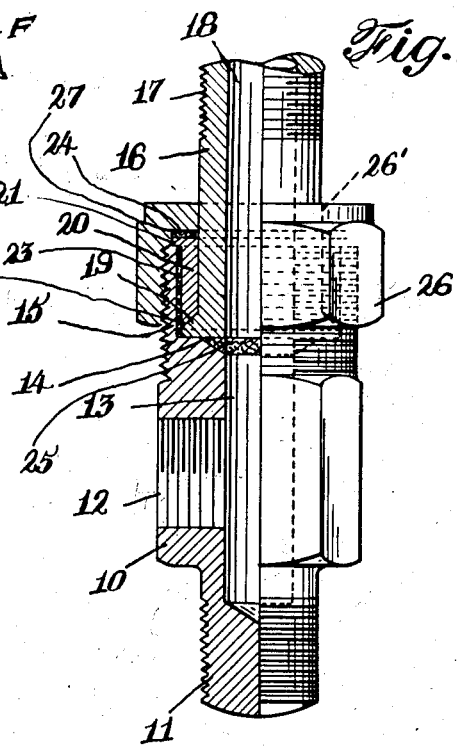
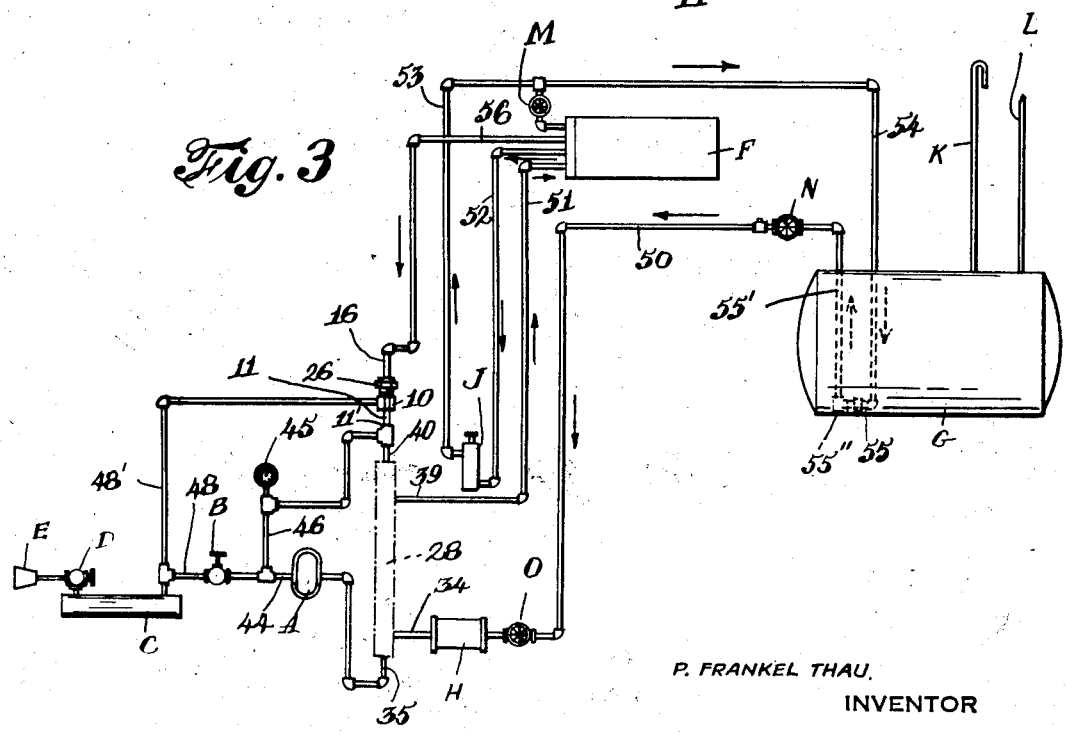
P. FRANKEL THAU,
INVENTOR
BY
ATTORNEY Patented Feb. 27, 1940

2,191,688

UNITED STATES PATENT OFFICE 2,191,688

SWIVEL T COUPLING

Philip Frankel Thau, New York, N. Y.

Application December 22, 1937, Serial No. 181,135

1 Claim. (Cl. 285—97.5)

This invention relates generally to improvements in a swivel T coupling, but more specifically to a coupling which is especially useful in conjunction with a hot oil circulating system used for oil burners.

The main object of the invention resides in the provision of a swivel T or coupling which is fluid tight for fuel oils passing therethrough under pressure, which operates with a high degree of efficiency and ease and which is easily assembled, disassembled and secured in the circuit of an oil circulating system.

A further object of the invention resides in the provision of a coupling wherein the main coupling piece is adapted to be secured to and connected with a line movable with and secured to the oil burner door and wherein a tubular fitting associated with the main coupling piece is connected to a stationary return line.

These objects and other incidental ends and advantages of the invention will hereinafter appear in the progress of the disclosure and as pointed out in the appended claim.

Accompanying this specification is a drawing showing a preferred form of the invention as applied to a novel hot oil circulating system wherein corresponding reference characters designate corresponding parts throughout the several views and wherein:

Figure 1 is a front view in elevation showing an oil burner door and a hinge post secured to the wall of the furnace, the said door and hinge post containing piping and apparatus including the above mentioned swivel T coupling.

Figure 2 is a view of the swivel T coupling partially in elevation and partially in section along the vertical axis.

Figure 3 is a diagrammatic view of a hot oil circulating system.

In accordance with the invention and in accordance with the preferred form thereof shown in conjunction with a novel hot oil circulating system, the swivel T coupling comprises a main coupling piece 10 having a polygonal outer surface, the said coupling piece having at one end an externally threaded and solid connecting piece 11. 12 represents a lateral and internally threaded bore communicating with a central vertical bore 13, the latter at its upper edge being provided with a flared or conical seat 14, the latter communicating with an enlarged and externally threaded gland chamber 15. It is to be observed that bore 12 is adapted to engage a pipe line such as 48' shown in Figure 1, while the connecting piece 11 is adapted to be secured to a lug on another pipe line such as lug 11', the said pipe line 48' and lug 11' being secured to and movable with the oil burner door 33.

The main coupling piece 10 is provided with a tubular fitting 16, the latter being adapted to be in communication with the vertical bore 13 whereby fluid passing into the said fitting 16 is bypassed through bore 12 into the pipe or feeding line 48'. The tubular fitting 16 is provided with an external thread 17 at the upper end thereof to engage the return line 56 issuing from heater F. The bore 18 of tubular fitting 16 proceeds in communicating relation with bore 13 and bore 12 of the main coupling piece 10.

Tubular fitting 16 is provided with a bottom flange 19 whose upper walls are flared or tapered, the undersurface of the said flange 19 being adapted to sit on the bottom wall of gland chamber 15 above conical packing seat 14, which latter contains packing 25, as shown in Figure 2. Thus, it is seen that tubular fitting 16 is rotatable within gland chamber 15 by means of the undersurface of flange 19 bearing against the bottom wall of the gland chamber.

A gland ring 20 is in slidable engagement with fitting 16 and is provided with an upper shoulder 21 adapted to abut the upper wall of gland chamber 15, while the lower edge of the said gland ring is provided with a taper 22 of an angle corresponding to the taper of flange 19 whereby a proper fitting is effected. The small space between the outer walls of gland ring 20 and the inner walls of gland chamber 15 is utilized for the receipt of packing 23. 24 represents a disc of packing between the upper surface of shoulder 21 and the upper wall 27 of a lock nut 26 which is internally threaded to engage the externally threaded gland chamber 15, the said lock nut 26 having a central hole 26' to permit penetration therethrough of tubular fitting 16.

Thus, coupling piece 10 together with lock nut 26 and gland ring 20, all secured together in fluid tight relationship, are integrally rotatable about the bottom wall of tubular fitting 16 and the flared walls 22 and side walls thereof, as best shown in Figure 2. Flange 19 of fitting 16 abuts against the lower tapered edge 22 of the gland ring 20 and is thereby prevented from upward displacement when lock nut 26 engages gland chamber 15.

The swivel T above described is especially adaptable for oil burner circulating systems where it is essential that a by-pass coupling have fluid tight properties. Thus, in Figures 1 and 3 the swivel T is shown in combination with an oil burner circulating system comprising an oil tank, a pumping line therefrom, an oil pressure regulator in the pumping line, a feed line and a return line for the excess oil emanating from the pumping line, a heater into which the said return line passes, a line between the heater and the swivel T through which the heated oil passes, and a line from the swivel T to the feed line.

More specifically, an oil burner construction and system shown diagrammatically in the drawing shows a hinged post wall 28 and hinges 29 and 30 affixed to the wall of a furnace. The furnace door 33 is provided with arms 31 and 32 which turn on post 28. Numeral 34 indicates an inlet pipe extending from the pumping line emanating from oil tank G, the said inlet pipe communicating with an inlet bore 34' in hinge post 28, while numeral 35 represents the conventional swivel arm in post 28 within bushing 36, 37 being the lower threaded outer surface of hinge post 28 to which a cap 38 is secured. 39 similarly represents an outlet pipe communicating with the return line for the excess oil emanating from the pumping line and proceeds from the hinge post 28 and being in communication with bore 39' within the said hinge post, the swivel arm 40 in post 28 being within a bushing 41, 42 representing the upper threaded outer surface of hinge post 28 to which cap 43 is secured. Thus has been described the conventional means in which arms or pipes 35 and 40 swivel with the opening and closing of furnace door 33.

Secured to inlet pipe 35 is an oil pump A from which extends a pipe line 44, the oil pump A sucking oil from tank G, and forcing same into pipe 46, 39, 51 into heater F. When properly heated, the oil is returned through pipe 56, 16, the swivel T, 48', electric heater C and atomizer E. The partly heated oil coming out of heater F is returned through pipe 52, pressure regulating valve J, 53, 54, fitting 55, pipe 55'. By opening valve B, when heater F is cold, oil is delivered from pump A direct to electric heater C through 44 and 48. Thus the oil is heated to two degrees of temperature, preferably 120 and 160 degrees. The warm oil from heater F proceeds from pipe 52 through an oil pressure regulating valve J, through pipes 53 and 54 to the oil tank G, from the oil tank G by means of fitting 55 and pipe 55' outwardly. The fitting 55 at one side is provided with an opening 55'' to release any gas bubbles in the system between pipes 54 and 55'. The oil from 55' proceeds through a valve N along pipe 50, through valve O, through oil strainer H, through the hinge post 28, through pipe 35. In this way the oil in tank G is preheated. However, the hot oil that issues from the heater F through pipe 56 is not returned to tank G, but is directly by-passed through the swivel T into the feed pipe 48'. Thus, hot oil from heater F proceeds through pipe 56, through 16 through the swivel T connection, through pipe 48', through electric heater C, through needle valve D to atomizer E. The oil tank G is provided with the usual vent line K and fill line L.

The above system thus affords a method of preheating the fuel oil before the same goes to the feed line by means of a hot water oil heater.

I wish it understood that minor changes and variations in the integration, material, position and shaping of parts of the swivel T connection, together with minor changes in the system, may all be resorted to without departing from the spirit of the invention and without departing from the scope of the appended claim.

I claim:

A swivel T for an oil burner door post comprising a main coupling piece having offset communicating bores and a securing lug at the lower end of and along the longitudinal axis of the coupling piece to secure said coupling piece to the door post, a gland chamber in said coupling piece communicating with one of said bores, a tubular fitting on which the coupling piece swivels, the said fitting having a bottom flange in rotatable engagement with the seat of the gland chamber, a gland ring slidable on said tubular fitting and abutting the bottom flange thereof and being adapted to sit within and substantially along the full length of the gland chamber, packing between the outer walls of the gland ring and the inner walls of the gland chamber, and a lock nut engageable with the main coupling piece and being adapted to lock the gland ring in the gland chamber.

PHILIP FRANKEL THAU.